UNITED STATES PATENT OFFICE.

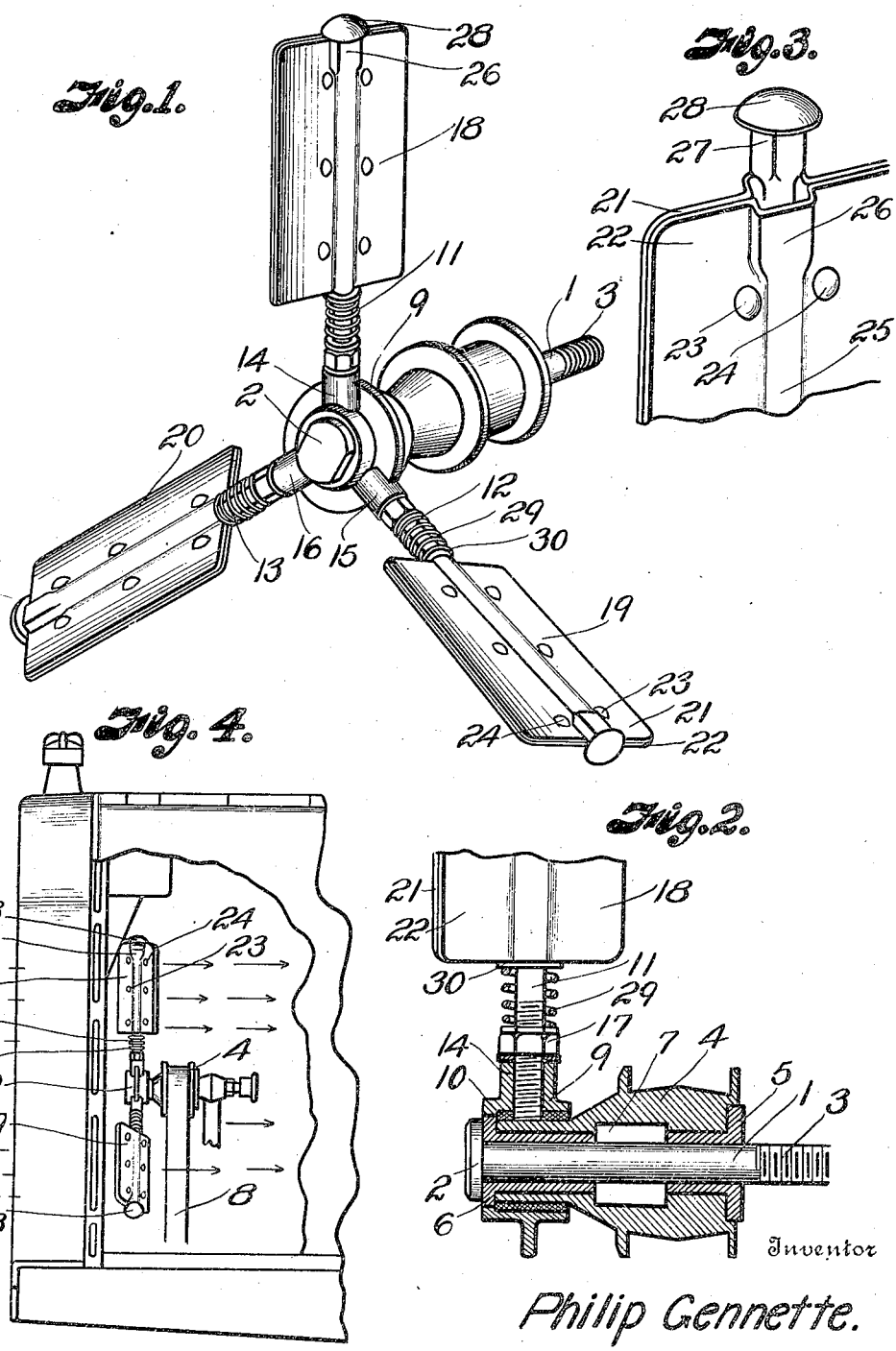

PHILIP GENNETTE, OF AURORA, KANSAS.

MOTOR FAN.

1,419,841.  Specification of Letters Patent.  Patented June 13, 1922.

Application filed December 31, 1920. Serial No. 434,304.

*To all whom it may concern:*

Be it known that I, PHILIP GENNETTE, a citizen of the United States, residing at Aurora, in the county of Cloud and State of Kansas, have invented certain new and useful Improvements in Motor Fans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cooling fans for motor vehicles.

One of the objects of the invention is to provide a fan with reversible blades whereby the air may be drawn through the radiator and directed over the engine or vice versa.

In the summer time it is desirable to draw the air through the radiator and over the engine for the purpose of maintaining the cooling water at a relatively low temperature but in the winter time there is a tendency for the water to freeze in the radiator.

I have, therefore, provided means whereby the fan blades may be conveniently reversed so that the direction of the flow of air will be reversed to direct warmed air from the engine through the radiator to raise the temperature of the water above the freezing point.

I have provided means whereby the fan can be applied to the usual fan pulley in a convenient manner, the fan being removably secured so that in the event that the pulley wears out, a new pulley can be substituted.

In the drawings,

Fig. 1 is a perspective view of a fan constructed in accordance with my invention.

Fig. 2 is a vertical, longitudinal, sectional view through a pulley, and bearings therefor, the fan arm being shown in elevation.

Fig. 3 is a top end perspective view of one of the blades, showing the fan blade supporting arm head projecting out of the fan blade socket, and Fig. 4 is a fragmentary side elevational view of a motor vehicle hood showing my invention applied.

In carrying out the invention I prefer to provide a stub shaft or bolt 1, having a head 2 at one end and threads 3 at the other. The pulley 4 is provided with bushings 5 and 6 adapted to bear upon the stub shaft 1, there being a space 7 between the bushings to receive lubricating grease.

The pulley may be driven upon the stub shaft 1 by a suitable fan belt as, for example, 8, shown in Fig. 4. Rigid on the pulley 4 is a spider consisting of a hub 9, which may be removably fastened to the hub 4 by a fusible metal, such as babbitt or the like, as indicated at 10. The purpose of securing the head 9 to the pulley by the fusible metal is to facilitate the disassociation of the pulley 4 from the head when the pulley wears out so that a new pulley may be substituted.

The head 9 is provided with a plurality of radial arms 11, 12 and 13, threaded in sockets 14, 15 and 16, carried by the head, there being lock nuts 17, one on each arm to prevent accidental turning movement of the arm with respect to the head.

Slidably mounted upon the arms are fan blades 18, 19 and 20. Each blade is shown as consisting of two leaves or plates 21 and 22 fastened together by rivets or bolts 23 and 24 on opposite sides of a longitudinal barrel-shaped portion formed by grooving opposite plates 21 and 22. The longitudinal barrel-shaped portions 25 for the respective plates are provided at their outer ends with angular sockets or recesses 26 adapted to receive the angular heads 27 on the arms, the outward movement of the blades being limited by the heads 28 on the respective arms and said blades are normally urged outward by the coil springs 29, one end of each spring bearing against the lock nut and the other against a washer or shoulder 30 at the inner end of its blade.

If it is desired to rotate the fan so that the air will be drawn through the radiator and over the engine, the blades will assume the position shown in Fig. 1 but if it is desired to reverse the direction of the air flow, the operator will push down on each blade and turn it to reversing position and then allow the socket member 26 to move up into engagement with the head 27 so that the blade will be held against rotative movement with respect to its arm but will rotate with the head, the reversal of the blade being effective in causing a reversal of the direction of flow of the air when the fan is rotated.

It will be seen that the blades may be reversed without the application of tools, simply by pushing down upon the blade to move it longitudinally against the action of its spring and then relieving the pressure so that the spring will be effective in forcing the socket of the particular blade which is moved back into engagement with the head.

What I claim and desire to secure by Letters-Patent is:

1. A motor fan comprising a rotatable head, radial arms carried by said head and having angular ends, and longitudinally, spring-urged blades slidable on the arms and having sockets at their outer ends to engage the heads so that the blades will be held against rotative movement with respect to their arms.

2. A motor fan comprising a head, radial arms carried by the head and having angular outer ends, longitudinally slidable blades carried by the arms having angular sockets to engage the angular ends of the arms, and springs on the arms interposed between the head and the ends of the blades.

3. A motor fan comprising a head, radial arms carried by said head, blade-engaging means on the ends of the arms, reversible blades having longitudinal and rotative movement with respect to their arms, means on the blades for engaging the ends of the arms to prevent rotative movement, of the blades with respect to said arms, and springs interposed between the ends of the blades and the head.

In testimony whereof I affix my signature.

PHILIP GENNETTE.